United States Patent Office 3,320,697
Patented May 23, 1967

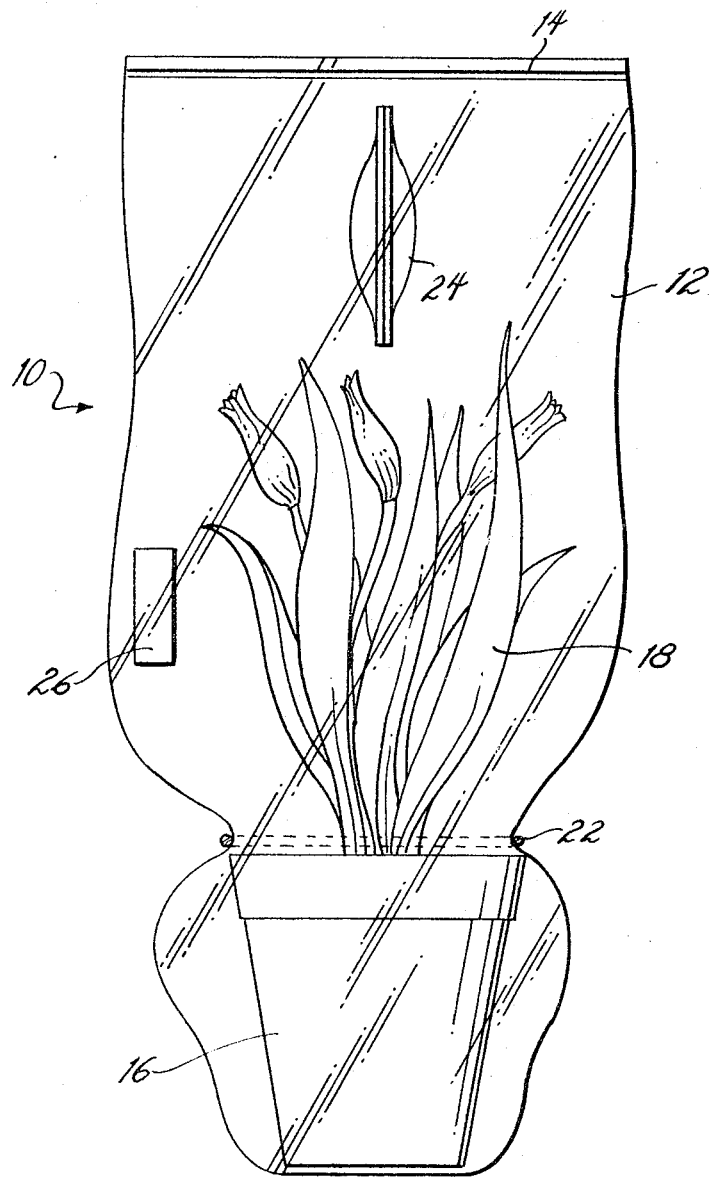

3,320,697
PLANT PROTECTOR
Norman B. Larsen, Collegeville, Pa., assignor to Matrix Laboratories, Inc., Collegeville, Pa., a corporation of Pennsylvania
Filed Apr. 19, 1965, Ser. No. 449,213
5 Claims. (Cl. 47—34.11)

This invention relates to a plant protector, and more particularly, to a protector for live growing plants as well as cut plants. Cut flowers are typical of cut plants which may be protected by the present invention.

The plant protector of the present invention is designed to increase the life span of cut flowers and blooms on plants and prevent premature spoilage during storage and delivery by florists or flower vendors. These general objects are obtained by enveloping the plant with a non-permeable transparent plastic overwrap. The plastic overwrap is preferably a transparent thermoplastic material capable of being heat-sealed. Within the overwrap, there is provided a means for generating carbon dioxide.

During the daytime plants fix carbon dioxide with the reaction of light on chlorophyll in the plant leaves to form the carbohydrate glucose. Glucose is the major food for plants and formation of the same is the major metabolic function of plants in their light phase. In their dark phase, the reaction is just the opposite. That is, plants give off carbon dioxide and absorb oxygen.

To merely provide an overwrap for cut flowers or blooming plants is insufficient since the same cuts off the supply of carbon dioxide and the plants prematurely spoil. This spoilage is prevented by the carbon dioxide generating means within the overwrap. At the same time, the overwrap does not interfere with the major metabolic function in the light phase and acts as a protector for the plants from insects, dirt, damage from surrounding elements, etc.

It is an object of the present invention to provide a novel plant protector.

It is another object of the present invention to provide a protector for plants which does not interfere with the metabolic function in the light phase while extending the bloom life of plants, protecting the same from its environment, while inhibiting premature spoilage.

It is another object of the present invention to provide a novel plant protector which is simple, inexpensive, and reliable.

Other objects will appear hereinafter.

For the purpose of illustrating the invention, there is shown in the drawings a form which is presently preferred; it being understood, however, that this invention is not limited to the precise arrangements and instrumentalities shown.

The drawing illustrates the plant protector of the present invention in conjunction with a potted blooming plant.

Referring to the drawing in detail, wherein like numerals indicate like elements, there is shown in FIGURE 1 a plant protector of the present invention designated generally as 10.

The protector 10 is in the nature of an overwrap 12 made from a transparent thermoplastic material such as polyethylene. Other transparent thermoplastics may be utilized for the overwrap 12. The overwrap 12 is in the nature of a bag closed at one end. The open end of the bag facilitates the introduction of a plant 18 disposed within a pot 16 so that the same may be introduced into the overwrap 12. Thereafter, the open end of the overwrap 12 may be closed with a joint 14. Joint 14 may conveniently be a heat-sealed joint.

If desired, a string, ribbon or other element 22 may be utilized to orientate the overlap 12 with respect to the pot 16 and thereby prevent substantial relative movement. A heat-sealed semi-permeable plastic envelope 24 is disposed within the overwrap 12. Envelope 24 may be made from polyethylene, Mylar, polyvinyl alcohol, nylon 6, ethyl vinyl acetate, polyvinyl butyral or such other suitable material, depending upon the type of vapor transmission desired. The envelope 24 may be supported on the inner surface of the overwrap 12 in any convenient manner such as by a heat-sealed joint, tape, adhesive, and the like.

The envelope 24 is semi-permeable and contains a quantity of a suitable reactant with moisture. The reactant may be sodium bicarbonate to form carbon dioxide. By varying the quantities of the reactant, the pressure in the closed overwrap 12 may be varied. As the closed overwrap 12 is evacuated by absorption of the carbon dioxide, additional diffusion of carbon dioxide will replace the same. Sufficient moisture will be provided within the container to slowly diffuse into the envelope 24 to create the reaction referred to above. Such moisture may be placed within the overwrap 12 by wetting the soil in the pot 16. Alternatively, a small amount of water such as a teaspoon may be introduced into the overwrap 12 in liquid form. The latter alternative would generally be used when the plants are in the form of cut flowers. If desired, a conventional oxygen scavenger 26 may be supported on the inner surface of the overwrap 12 to absorb excess oxygen discharged by the plant.

The plant is placed into the overwrap 12 and then the overwrap is closed. Thereafter, the plant is ready for storage or shipment. The protector 10 substantially slows down metabolism to prevent premature spoilage as well as protect the plant from its environment. Thus, the overwrap 12 protects the plant from environmenttal conditions such as rain, dirt, rough handling, etc. Since the overwrap 12 is transparent, the normal light phase of plant life is not interfered with. The oxygen scavenger 26 may be supported on the inner surface of the overwrap 12 in any convenient manner such as by a strip of tape.

The present invention may be embodied in other specific forms without departing from the spirit or essential attributes thereof and, accordingly, reference should be made to the appended claims, rather than to the foregoing specification as indicating the scope of the invention.

I claim:
1. A plant protector comprising a flexible transparent impervious outer wrap for embracing a plant, said outer wrap being capable of being closed to form a gas-tight enclosure for the plant, a semi-permeable envelope containing reactant, said envelope being disposed within the overwrap, said reactant being capable of forming carbon dioxide when water vapor diffuses through the envelope in order to enable the plant to perform its major metabolic function in the light phase.
2. A plant protector in accordance with claim 1 where- in said envelope is fixedly secured to the inner surface of said overwrap.

3. A plant protector in accordance with claim 1 including an oxygen scavenger fixedly secured to said overwrap and in communication with the interior of said overwrap.

4. A plant protector in accordance with claim 1 wherein said envelope contains sodium bicarbonate.

5. A plant protector in accordance with claim 1 wherein said overwrap is a bag made from a thermoplastic polymeric material.

References Cited by the Examiner

UNITED STATES PATENTS

| 2,278,198 | 3/1942 | Hall | 312—31 |
| 2,713,232 | 7/1955 | Peterson. | |
| 2,774,187 | 12/1956 | Smithers | 47—41 |

ANTONIO F. GUIDA, *Acting Primary Examiner.*

ABRAHAM G. STONE, P. A. RAZZANO,
*Assistant Examiners.*